United States Patent [19]

Angevine

[11] Patent Number: 5,705,031
[45] Date of Patent: Jan. 6, 1998

[54] PROCESS FOR REMOVING AND WASHING DREGS FROM GREEN LIQUOR IN A KRAFT PULP MILL

[75] Inventor: Peter A. Angevine, Charlotte, N.C.

[73] Assignee: Kvaerner Pulping Technologies AB, Karlstad, Sweden

[21] Appl. No.: 260,327

[22] Filed: Jun. 15, 1994

[51] Int. Cl.$^6$ ........................................ D21C 11/04
[52] U.S. Cl. .................... 162/30.11; 162/30.1; 210/137; 210/784; 210/928
[58] Field of Search ................ 162/30.11, 30.1, 162/29; 423/185, DIG. 3; 210/780, 784, 137, 331, 347, 402, 928

[56] References Cited

U.S. PATENT DOCUMENTS

| | | | |
|---|---|---|---|
| 3,740,308 | 6/1973 | Rapson et al. | 162/17 |
| 3,869,389 | 3/1975 | Rokitansky | 210/77 |
| 4,056,362 | 11/1977 | Gablin et al. | 23/260 |
| 4,168,243 | 9/1979 | Gablin et al. | 252/301.1 |
| 4,188,260 | 2/1980 | Rowlandson et al. | 162/16 |
| 4,196,169 | 4/1980 | Gablin et al. | 422/159 |
| 4,249,990 | 2/1981 | Gilbert et al. | 162/17 |
| 4,322,266 | 3/1982 | Nelson | 162/30 |
| 4,668,342 | 5/1987 | Blackwell | 162/30.11 |
| 4,929,355 | 5/1990 | Ragnegard et al. | 210/784 |
| 4,941,945 | 7/1990 | Pettersson | 162/29 |
| 5,082,526 | 1/1992 | Dorris | 162/30 |
| 5,145,556 | 9/1992 | Westerberg et al. | 162/29 |
| 5,282,931 | 2/1994 | LeClerc et al. | 162/49 |

OTHER PUBLICATIONS

Smook, Gary, "Handbook For Pulp & Paper Technologies", 1992, 2nd Edition, pp. 150–152.

Primary Examiner—Donald E. Czaja
Assistant Examiner—Dean T. Nguyen
Attorney, Agent, or Firm—Michael D. Bednarek; Marks & Murase L.L.P.

[57] ABSTRACT

In a kraft pulp mill, a process and apparatus for removing and washing dregs from green liquor so that the pH of the dregs is below "hazardous waste" levels. Specifically, green liquor clarifier underflow is filtered using a simple non-precoat cassette filter to form a first dregs cake. The dregs cake is diluted, preferably with water. The diluted dregs cake is then filtered in a precoat dregs filter to produce a dregs cake that is at least 50% solid and has a pH of about 12.0 or less.

7 Claims, 3 Drawing Sheets

PROCESS FOR REMOVING AND WASHING DREGS FROM GREEN LIQUOR IN A KRAFT PULP MILL

FIELD OF THE INVENTION

The present invention relates to an apparatus and process for removing suspended dregs from green liquor in a kraft pulp mill and washing the same in preparation for disposal. This application is specifically directed to an apparatus and process that uses much less water than conventional processes.

BACKGROUND OF THE INVENTION

Wood pulp or cellulose is prepared from wood or other vegetable material by a process of chemical dissolving and softening. The wood or other vegetable material is subjected to a preliminary cleaning treatment, mechanically chopped up and then boiled in large tanks with hot solutions. The boiling process, known as digesting, is performed with a caustic liquid referred to as white liquor. Lignin, which acts to adhere cellulose fibers, is dissolved by this treatment and is, in part, chemically decomposed, leaving a soft pulp which consists primarily of cellulose.

The present invention is intended for use in kraft pulp mills. Kraft pulping is performed by cooking wood chips in a highly alkaline liquor that selectively dissolves lignin and releases cellulosic fibers from the wood matrix. The two principal chemicals in the liquor are sodium hydroxide and sodium sulphide. Sodium sulphide, also a strong alkali, readily hydrolyses in water, producing sodium hydroxide and sodium hydrosulphide.

At the beginning of the kraft process, white liquor is fed to the digester. This liquor contains a high amount of effective alkali which, as explained above, is used to digest the wood. At the terminus of the digester, spent liquor, known as black liquor, is removed from the digester.

The pulping chemicals are then recovered from the black liquor by a process that is referred to as the recovery process. To begin with, black liquor from the digester contains low levels of effective alkali. Black liquor also contains large amounts of organic compounds that are removed and burned in a recovery furnace. The resultant mass of inorganic residue, called smelt, is dissolved to form green liquor having a low concentration of effective alkali and a high concentration of sodium carbonate. The green liquor is led to a green liquor clarifier for the removal of solid particles called dregs.

The clarified green liquor is subsequently causticized in a conventional process. Note, for example the process described in U.S. Pat. No. 4,941,945 to Pettersson. In particular, white liquor is regenerated from the green liquor by causticizing the carbonate through addition of lime. After the recausticizing operation, a small residual amount of sodium carbonate is carried to the digester. The total amount of sodium hydroxide, sodium sulphide and sodium carbonate is called the total titratable alkali (TTA).

The chemistry of the causticizing reaction is simple and known to those skilled in the art. In particular, lime (CaO) reacts with sodium carbonate ($Na_2CO_3$) in the green liquor to produce sodium hydroxide (NaOH) and calcium carbonate ($CaCO_3$), called lime mud. Because of its low solubility, calcium carbonate precipitates from solution.

Although the chemistry of the reaction is simple, the continuous nature of the process involves a number of unit operations—filtration, classification, mixing, sedimentation, calcining, and material handling. The entire process may be thought of a closed circuit operation involving solids as one cycle and the liquor as another. The two are brought together to furnish the cooking liquor and each subsequently is recycled and converted to that chemical form necessary to achieve the causticizing of the liquor. There are, however, some waste products. One such waste product is the dregs that are removed from the green liquor by the green liquor clarifier.

Since a kraft pulp mill produces large quantities of dregs, it is highly desirable to dispose of dregs in an inexpensive manner such as landfill. A problem arises, however, if the pH of the dregs exceeds the EPA standard for alkaline waste. Specifically, any solid waste material that is aqueous and has a pH above 12.5 is classified as a "hazardous waste" and is subject to extremely cumbersome regulations. Accordingly, the dregs must be washed to a pH below 12.5 before disposal in a landfill.

In addition, the material must be solid, so that it does not drip; a "paint filter" test is conventionally used—if it does not drip any water in five minutes, then it is considered solid. If foreign materials are added to make the dregs solid, then the dregs must be subjected to a compression test at 60 psi to see if it is "solid". This application is specifically directed to an apparatus and process for treating dregs to achieve a solid mass having a pH below 12.5, ideally about 12.0 or less.

The treatment of dregs produced while recausticizing kraft green liquor is discussed in several U.S. patents. For example, U.S. Pat. No. 4,668,342 to Blackwell describes a process for recausticizing kraft green liquor in which the underflow from the green liquor clarifier is filtered in a rotary vacuum filter and washed with hot water. The dregs are then passed to waste.

U.S. Pat. No. 4,941,945 to Pettersson describes a method for clarifying green liquor in which the green liquor is clarified by filtering and the sludge separated by the filter is discarded for dumping.

U.S. Pat. No. 5,082,526 to Dorris discloses a process by which raw green liquor is passed through a buffer tank and into a clarifier to remove dregs. The dregs then pass to a green dregs filter.

Likewise, U.S. Pat. No. 5,145,556 to Westerberg et al. discloses a process in which dregs that settle in the green liquor clarifier are pumped to a dregs precoat filter for thickening and washing. The patent also suggests that mixing lime mud and grits with the unclarified green liquor enhances the settling of the dregs in the clarifier and the washing on the precoat filter.

U.S. Pat. No. 5,282,931 to Le Clerc et al. discloses a process by which dreg deposits are filtered in a precoat dregs filter before passing through the disposal line.

Finally, U.S. Pat. No. 4,322,266 to Nelson discloses a process by which some dregs are pumped back to the recovery furnace.

None of these patents seem to acknowledge, much less address, the need to reduce the pH of dregs. One conventional system for reducing the pH of dregs involves washing dregs using a sedimentation dregs washer located upstream of a precoat dregs filter. In one known embodiment, about 20% of the available wash water is used to wash the dregs. This recovers approximately 80% of the soda in the dregs underflow. The dregs washer underflow is sent to a standard precoat dregs filter where it is dewatered to about 50% solids, and further washed with 1.65 displacements. This lowers the soda in the dregs cake to 0.14%, and the pH to an acceptable 11.93.

The trouble with the conventional dregs washing system is that it uses too much water and sends too much soda to the weak wash system. The dregs washer overflow and the dregs filter filtrate must go to the weak wash system. This can be viewed as diverting wash water from the mud, or adding soda to the mud washing system, but the result is the same—mud washing suffers. Other problems are also expected.

Likewise, washing the dregs to the required pH on a precoat dregs filter is not practical. The number of wash displacements is so great that the washing efficiency cannot be maintained. Moreover, it is doubtful that the required amount of water would flow through the cake, even at half the filter loading.

Thus, there is a need for an alternative process for washing dregs.

Finally, in describing the kraft pulp mill process, the terms overflow and underflow are commonly used. These are terms of art. In general, the term "underflow" is used to refer to the material, typically solid concentrate, that is removed from the flow or retained by the filter or clarifier. The term "overflow" refers to the filtrate or the material that passes through the filter or clarifier.

SUMMARY OF THE INVENTION

The present invention proposes an alternative process by which dregs are filtered, rather than washed, before passing to the precoat dregs filter. Assuming the existing green liquor clarifier is of adequate size and performance, a simple filter is used to dewater the underflow, from 5-7% suspended solids to 50% suspended solids. Since the material has passed through the green liquid clarifier, the filtrate (green liquor) can be returned to storage, rather than the weak wash.

The process of the present invention includes the steps of: clarifying the green liquor in a green liquor clarifier to separate the green liquor into an overflow comprising clarified green liquor and an underflow comprising dregs and green liquor; filtering the underflow to form a first dregs cake that is at least 50% solid; diluting the dregs cake, preferably by water flushing, to less than 20% solid; filtering the diluted dregs cake to form a second dregs cake that is at least 50% solid.

The apparatus of the present invention includes a green liquor clarifier for separating green liquor into an overflow containing clarified green liquor and an underflow containing dregs and green liquor; a first filter for filtering green liquor from the underflow so as to form a dregs cake; means for diluting the dregs cake; and a second filter for filtering the diluted dregs cake.

Through the use of a simple filter, it is possible to filter the dregs to form a dregs cake that is about 50% solid. In this way, about 92% of the soda is removed in this initial filtering step and returned to the green liquor system. The resultant dregs cake will contain much less soda than the underflow of a conventional dregs washer. By back-flushing the dregs cake with water to a dilution of 15%, then filtering and washing on the dregs filter, the soda content is further reduced and the pH of the dregs cake is reduced to an acceptable level.

The process of the present invention requires only a small fraction of the amount of water required by conventional dregs washing. According to one proposed application of this process, the dregs filter filtrate is the only water sent back to the weak wash system. As a result, less than 2% of the water needed with conventional technology is used in this embodiment of the present invention.

Thus, the present invention differs from known kraft mill processes and provides an alternative to dregs washing. According to this alternative, a filter is used in place of the dregs washer. Thus, two stage filtration is used instead of a simple dregs filter or a sedimentation dregs washer followed by filtration.

A precoat filter is often used as the dregs filter in a conventional kraft pulp mill having one filter with or without dregs washing. In the two stage filtration process of the present invention, two precoat filters in series could be used.

The inventor has found, however, that there are disadvantages associated with the use of two precoat filters in series. To begin with, two filters means two precoats using two to three times the lime mud used by a single standard precoat filter. Another problem is oxidation: the precoat vacuum filter will suck a lot of air through the cake, oxidizing an appreciable amount of the sodium sulphide to sodium thiosulfate which is highly corrosive.

Accordingly, in accordance with the best mode currently contemplated by the present invention, the initial filtration is performed by a cassette type pressure filter such as that sold under the trademark CAUSTEC™ by Kvaerner Pulping Technologies AB of Karlstad, Sweden. The CAUSTEC™ casette filter is an enclosed vessel containing a series of perforated tubes covered with a filter media. The CAUSTEC™ cassette filter does not require a precoat and uses the pressure of the liquid feed pump to provide the driving force for filtration, thus, there is no vacuum pump and no air infiltration. Moreover, the system uses much less power. At the same time, a greater differential power is developed, so a drier cake is formed. This filter can recover at least 93% of the soda in the green liquor clarifier underflow. Since liquor is simply filtered out of the dregs, there is no dilution, and the filtrate can be returned to green liquor storage without any problems.

Naturally, other suitable filters could be used. In that regard, it should be appreciated that one of the advantages of the present invention is that a variety of conventional filters can be used to perform the novel step of filtering the dregs before the dregs are sent to the precoat dregs filter.

BRIEF DESCRIPTION OF THE DRAWINGS

A more complete appreciation of the invention and many of the attendant advantages thereof will be readily obtained as the same become better understood by reference to the following detailed descriptions when considered in connection with the accompanying drawings, in which.

DETAILED DESCRIPTION

Figure 1:
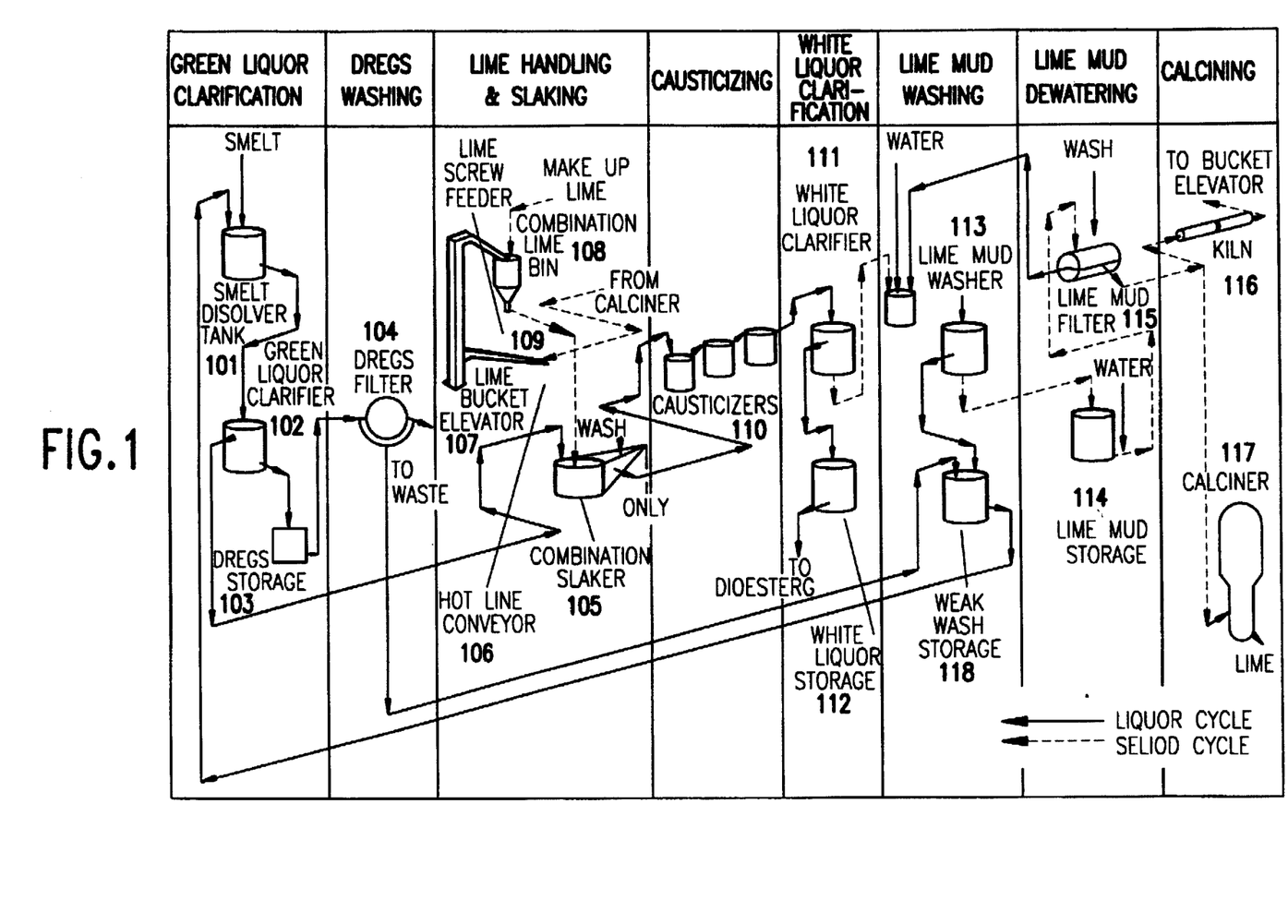
FIG. 1 depicts a conventional kraft mill recausticizing system.

Referring now to the drawings, wherein like reference numerals designate identical or corresponding parts throughout the several views, and more particularly to FIG. 1 thereof, in a conventional kraft liquor cycle, the digestion of wood chips takes place in one or more digesters employing an aqueous mixture of sodium hydroxide and sodium sulfide called white liquor. After the cooking operation, the waste liquor, sometimes referred to as black liquor, is separated from the pulp fibers, concentrated and burnt in a recovery furnace to form a smelt. The smelt, which consists mainly of sodium carbonate and sodium sulfide, is then dissolved in an aqueous solution, usually referred to as a weak wash, to form the green liquor.

FIG. 1 shows schematically a recausticizing plant wherein the smelt and water are added to a smelt dissolver tank 101. The raw green liquor is then passed to a green liquor clarifier 102 where the dregs, comprising mainly carbonaceous particles and metallic compounds insoluble in the green liquor are removed. The dregs are conveyed to dregs storage 103 and then to a dregs filter 104. The clarified green liquor is mixed with lime in a combination slaker 105 to convert the sodium carbonate to sodium hydroxide in accordance with the formula:

$$CaO+Na_2CO_3+H_2O \rightarrow 2NaOH+CaCO_3$$

(The lime is added by means of a number of components comprising a hot lime conveyor 106, a lime bucket elevator 107, a combination lime bin 108, and a lime screen feeder 109.) During this reaction the lime and calcium carbonate are insoluble and are, therefore, present in the liquid as suspended solids. Several other impurities from the lime or from the dregs are also insoluble and become part of the suspended solids. The mixture of these insoluble compounds forms the lime mud.

To complete the reaction, the slurry, which comprises sodium hydroxide and calcium carbonate particles, is passed through a series of agitated vessels called causticizers 110. The slurry is allowed to react at temperatures between about 90° and 105° C. for a period varying from 60 to 180 minutes. The reacted mixture is then passed to a white liquor clarifier 111 to separate the lime mud from the white liquor. The white liquor then goes to the white liquor storage 112 for use in the digestion of wood chips and contains mostly an aqueous solution of sodium hydroxide and sodium sulfide.

The thickened lime mud is washed in a lime mud washer 113, passes through a lime mud storage tank 114 and a lime mud filter 115 where it is dewatered and then calcined in a lime kiln 116 or in a fluidized bed calciner 117 to yield reburned lime which is reused for causticizing green liquor in the slaker.

In the conventional process shown in FIG. 1, the underflow of the green liquor clarifier is passed directly to a dregs filter 104. The dregs filter is typically a precoat filter. The dregs cake formed on the precoat filter is discarded, while the overflow is directed to a weak wash storage tank 118. This process does not reduce the pH of the dregs to an acceptable level, however. Thus, in accordance with the process of the present invention, the underflow from the green liquor clarifier is subjected to a preliminary filtering step to remove green liquor from the underflow so that the dregs constitute about 50% suspended solids. In this way, a significant percentage of the soda is removed from the underflow before the precoat dregs filter step.

Figure 2:
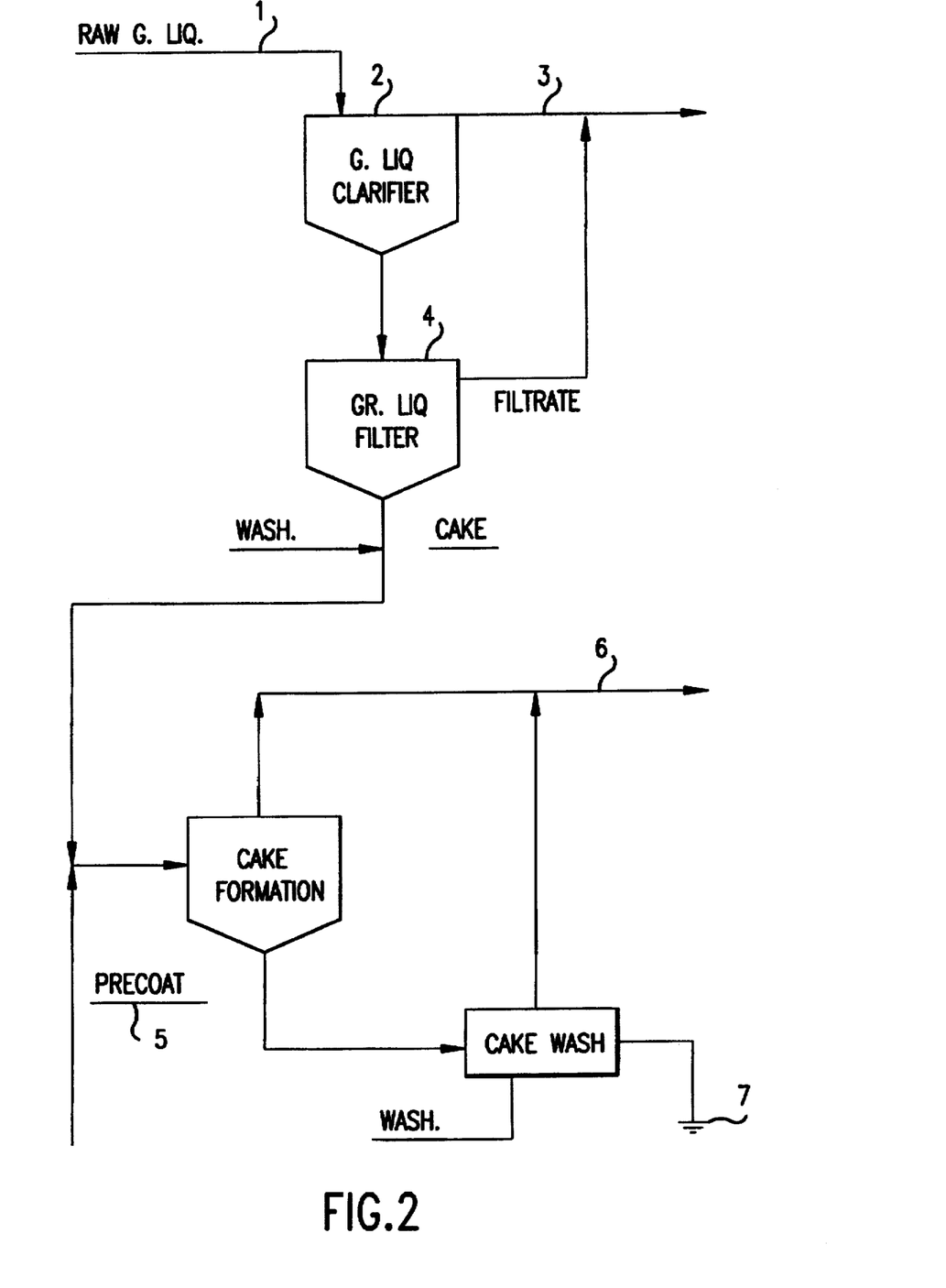
FIG. 2 represents a portion of the kraft mill recausticizing system employing an embodiment of the present invention, the green liquor filter.

FIG. 2 depicts one embodiment of the apparatus of the present invention in which the kraft mill recausticizing system employs a green liquor filter. More specifically, the raw green liquor passes through a conduit 1 to a green liquor clarifier 2. The overflow from the green liquor clarifier flows on through additional conduit 3 for the green liquor circuit. The underflow from the green liquor clarifier passes on to a green liquor filter 4, which filters the underflow. The filtrate from the green liquor filter is returned to the conduit 3 constituting the green liquor circuit. The resultant cake from this filter is washed with water and passes on to a precoat filter 5.

This precoat filter operates in a conventional fashion, in which there is an initial cake formation and the resultant overflow from formation of the cake is passed through conduit 6 to the white liquor. The cake is subsequently washed and the washing is also passed through to the white liquor conduit 6. By virtue of this process, the pH of the dregs cake is reduced to an acceptable level. The cake resulting from the wash is then discarded as waste 7.

Figure 3:
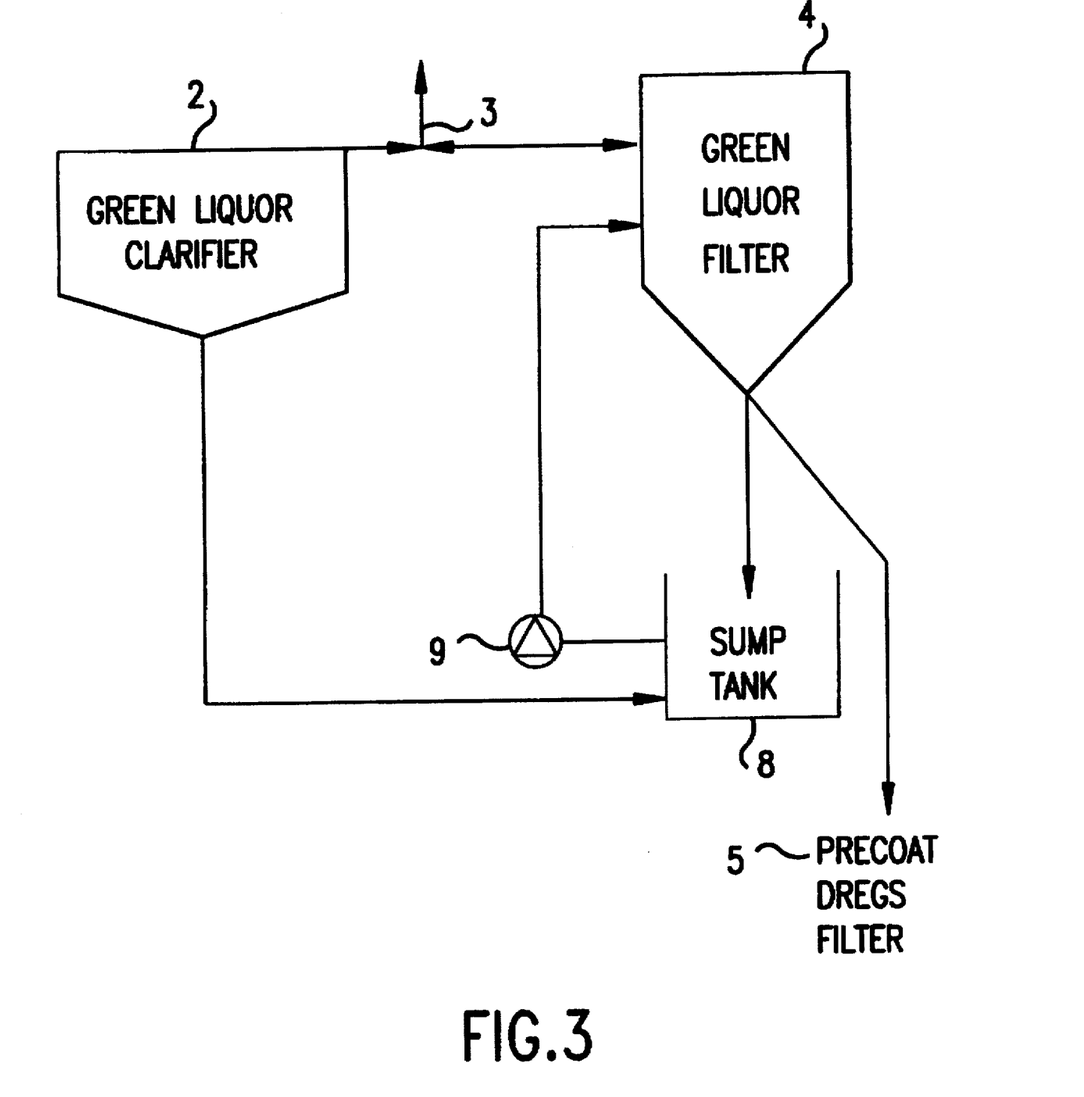
FIG. 3 depicts a preferred embodiment of the present invention in which a sump tank is used in conjunction with the dregs filter of the present invention in a kraft mill recausticizing system.

FIG. 3 depicts a preferred embodiment of the present invention in which the underflow of the green liquor clarifier 2 is directed to a sump tank 8, the contents of which are pumped by pump 9, either periodically or continuously, to the green liquor filter 4 (alternatively referred to as a dregs filter). The filtrate is then directed to the green liquor circuit 3, while the underflow is directed to the precoat filter 5 (or second dregs filter) indicated in FIG. 2.

Other features of the invention will become apparent in the course of the following descriptions of exemplary embodiments which are provided for illustration of the invention and are not intended to be limiting thereof.

In the description of the invention, all percentages are given in term of a ratio of weight to weight.

A production rate of 1680 BDTPD (bone dry tons per day) kraft linerboard on two lines and 450 BDST/day (bone dry short tons) semichemical corrugating medium is assumed, using a modified green liquor cooking in which the green liquor/white liquor ratio is higher than the normal 1.2.

| | |
|---|---|
| White liquor flow | 734 GPM |
| Green liquor to semichem | 50 GPM |
| Green liquor flow | 924 GPM |
| Green liquor to slaker | 874 GPM (depends on WLC U-flow consistency) |
| TTA (total titratable alkali) | 7.800 lb./cu. ft. |
| AA (active alkali) | 6.668 lb./cu. ft. |
| EA (effective alkali) | 5.835 lb./cu. ft. |
| Sulfidity | 25%– of AA |
| Causticity | 81.5% |
| Lime availability | 85% |
| Scrubber recycle | 0% (precipitator, dry return) |
| Dregs | 2774 ppm or 17.0 lb./BDT pulp |
| WLC (white liquor clarifier) underflow | 42% ss (suspended solids) |
| LMW (lime mud washer) underflow | 44% ss |
| LM (lime mud) filter feed | 34% ss |
| LM filter cake | 75% TS (total solids) |
| Wash displacements | 0.9 (30 GPM) (gallons per minute) |
| EQUIPMENT SIZE | |
| Green liquor clarifier | 70 ft. dia. × 40 ft. high |
| Dregs filter | 6 ft. dia × 8 ft. face |

The process of the present invention requires two stage filtration of the underflow of the green liquor clarifier. This could be done using two precoat filters in series, but this means two precoats, using two to three times the lime mud. In such an example, the estimated total lime mud required is 40 TPD or 8% of the process flow. In contrast, a standard precoat filter would use about 15 TPD or 3% of the process flow.

According to the best mode of the present invention, a CAUSTEC™ pressure filter is used for this application. Adapted as a green liquor filter, the CAUSTEC™ cassette filter requires no precoat and can recover at least 93% of the soda in the green liquor clarifier underflow. Since the liquor is simply filtered out of the dregs, there is no dilution, and the filtrate can be returned to green liquor storage without any problems.

The CAUSTEC™ cassette filter is an enclosed vessel, which uses the pressure of the liquor feed pump to provide the driving force for filtration. Thus, there is no vacuum pump and no resultant air infiltration, and the system uses much less power. At the same time a greater differential pressure is developed, so a drier cake is formed.

The soda content of the dregs in the green liquor clarifier underflow is about 44%. The soda content in the green liquor filter cake at 50% ss is about 9.4%. Specifically, 1912 lb./hr. of soda is recovered. Out of 2068 lb./hr.in the underflow, only 156 lb./hr. of soda is left in the cake. 50% solids in the filter cake has been assumed for the calculations, but 70% solids or more can be achieved in a preferred embodiment employing green liquor filtration.

The cake is washed after cake formation. Calculations show that a very reasonable amount of wash, between approximately 1 and 2 displacements, should be sufficient to wash the cake down to a pH of 12.

The dregs cake is sluiced off the CAUSTEC™ cassette filter by backwashing with water. This water also serves to wash out a great deal of soda when the dregs are filtered on a precoat filter. In this example sufficient water is used to form a 10% suspended solids slurry to feed the precoat filter. This is thin enough to form a good cake and do a good washing job. Consideration of the mechanism of precoat filtration shows that adding more water at this point does not affect the precoat filter sizing, which is based on solids, not liquid flow. The dregs filter filtrate flow is only 39 GPM and can be easily absorbed in the weak-wash system. The weak-wash flow is calculated at 914 GPM, so the dregs filtrate is about 4% of the total weak wash flow.

In alternate embodiments of the present invention, filters other than a CAUSTEC™ cassette filter may be employed. Such filters can be conventional filter devices employed in the industry which can effectively separate the underflow from the green liquor clarifier.

Tables 1 and 2 further demonstrate the advantages offered by the present invention relative to the prior art. Table 1 represents a flowsheet summary of a conventional kraft mill recausticizing system. Table 2 depicts a flowsheet summary of a kraft mill recausticizing system embodying the present invention.

TABLE 1

| EXAMPLE | FLOWSHEET SUMMARY | 05/18/93 CFD | "WLC2DW" CFH | GPM | WATER LB/HR | SOLIDS LB/HR | STPD | % Na2O |
|---|---|---|---|---|---|---|---|---|
| 1A | RAW GREEN LIQUOR FLOW 90° C. | 148538 | 6189 | 772 | 372481 | 753 | 9.0 | |
| 1B | G L CLARIFIER OVERFLOW 90° C. | 144776 | 6032 | 752 | 363492 | 44.2 | 0.5 | |
| 1C | G L CLARIFIER UNDERFLOW | 3265 | 136 | 17 | 7741 | 708 | 8.5 | 44.2% |
| 2A | WATER TO DREGS WASHER | 16352 | 681 | 85 | 41590 | | | |
| 2B | DREGS WASHER FEED | 20324 | 847 | 106 | 50580 | 704 | 8.4 | 44.3% |
| 2C | DREGS WASHER OVERFLOW | 16565 | 690 | 86.1 | 41590 | 4.3 | 0.1 | |
| 2D | DREGS WASHER UNDERFLOW | 3761 | 157 | 19.5 | 8989 | 704 | 8.4 | 21.5% |
| 3A | DREGS FILTER LIME MUD PRECOAT | 568 | 23.6 | 2.9 | 1054 | 1056 | 12.7 | |
| 3B | TOTAL TO DREGS FILTER | 4328 | 180 | 22.5 | 10043 | 1760 | 21.1 | 10.8% |
| 5A | FIRST DREGS FILTER CAKE 70° C. | 1037 | 43.2 | 5.4 | 1756 | 1760 | 21.1 | 0.44% |
| 4 | DREGS FILTER WASH WATER 70° C. | 1139 | 47.5 | 5.9 | 2898 | | | |
| 5B | WASHED DREGS FILTER CAKE 70° C. | 1037 | 43.2 | 5.4 | 1756 | 1760 | 21.1 | 0.14% |
| 6 | DREGS FILTER FILTRATE 70° C. | 3983 | 166 | 20.7 | 10131 | 0.0 | 0.0 | |
| 7 | TOTAL DREGS SYSTEM OVERFLOW | 20336 | 847 | 105.6 | 51721 | 4.3 | 0.1 | |
| 8 | WATER TO SLAKE LIME (95° C.) | 2788 | 116.2 | 14.5 | 6977 | | | |
| 9 | LIME USE, BONE DRY | 6179 | 257 | 32.1 | | 25549 | 306.6 | |
| | MUD GENERATED, BONE DRY | 6179 | 257 | 32.1 | | 42592 | 511.1 | |
| 10 | GRIT LOSS (WET) | 182 | 7.6 | 0.9 | 275 | 511 | 6.1 | |
| 11 | GRIT WASH WATER | 108 | 4.5 | 0.6 | 275 | | | |
| 12 | FLOW THROUGH CAUSTICIZERS 95° C. | 148601 | 6192 | 772 | 356515 | 42126 | 505.5 | |
| 13 | WHITE LIQUOR FLOW AT 95° C. | 124579 | 5191 | 647 | 311702 | 37.3 | 0.45 | |
| 14 | W L C UNDERFLOW AT 95° C. | 24017 | 1001 | 125 | 44813 | 42088 | 505.1 | 12.2% |
| | W L C UNDERFLOW AT 70° C. | 23726 | 989 | 123 | 44813 | 42088 | 505.1 | |
| 15 | SCRUBBER RECYCLE 70° C. | 81438 | 3393 | 423 | 204455 | 7242 | 86.9 | |
| 26 | FILTRATES | 66366 | 2765 | 345 | 168791 | 8.5 | 0.1 | |
| 7 | DREGS SYSTEM OVERFLOW | 20336 | 847 | 106 | 51721 | 4.3 | 0.1 | |
| 16 | L M W FEED 70° C. | 175520 | 7313 | 912 | 428191 | 49382 | 592.6 | 14.1% |
| 17 | L M W OVERFLOW (WEAK WASH) 70° C. | 146457 | 6102 | 761 | 372481 | 38.1 | 0.46 | |
| 18 | L M W U'FLOW TO MUD STORAGE 70° C. | 29063 | 1211 | 151 | 55710 | 49344 | 592.1 | 2.94% |
| | DILUTION WATER-DF PRECOAT | 758 | 32 | 3.9 | 1928 | | | |
| | DILUTION WATER-LMF FEED | 34651 | 1444 | 180 | 88130 | | | |
| 19 | TOTAL DILUTION WATER | 35409 | 1475 | 184 | 90058 | | | |
| 20 | LIME MUD TO DREGS FILTER | 1380 | 57 | 7.2 | 3120 | 1056 | 12.7 | |
| 21 | FILTER FEED SLURRY | 63091 | 2629 | 328 | 142647 | 48288 | 579.5 | 3.00% |
| 22 | CAKE WASH WATER | 15778 | 657 | 82 | 40129 | | | |
| 23 | FILTER CAKE | 13315 | 555 | 69 | 16052 | 48279 | 579.4 | 0.086% |
| 24 | LMF FILTRATE 70° C. | 65554 | 2731 | 341 | 166725 | 8.5 | 0.10 | |
| 25 | DREGS FILT PRECOAT FILTRATE | 812 | 34 | 4.2 | 2066 | | | |
| 26 | TOTAL FILTRATES | 66366 | 2765 | 345 | 168791 | 8.5 | 0.10 | |
| 27 | SMELT | | | | | 715 | 8.6 | |
| 28 | SMELT & WEAK WASH (RAW GREEN LIQUOR) | | | | | | | |

| EXAMPLE | FLOWSHEET SUMMARY | SLURRY SS | SLURRY SP GR | LB/HR CHEM | TTA | BREAKDOWN OF CHEM-LB/HR | | | |
|---|---|---|---|---|---|---|---|---|---|
| | | | | | | NaOH | Na2S | SO4 | Na2CO3 |
| 1A | RAW GREEN LIQUOR FLOW 90° C. | 1669 | 1.17 | 77809 | 47859 | 4520 | 17088 | 3554 | 52647 |
| 1B | G L CLARIFIER OVERFLOW 90° C. | 100 | 1.17 | 78430 | 47251 | 4520 | 16325 | 4940 | 52644 |
| 1C | G L CLARIFIER UNDERFLOW | 7.00% | 1.19 | 1670 | 1006 | 96 | 348 | 105 | 1121 |

TABLE 1-continued

| | | | | | | | | | |
|---|---|---|---|---|---|---|---|---|---|
| 2A | WATER TO DREGS WASHER | | 0.98 | 625 | −605 | | −762 | 1386 | |
| 2B | DREGS WASHER FEED | 1.3% | 1.00 | 1670 | 1006 | 96 | 348 | 105 | 1121 |
| 2C | DREGS WASHER OVERFLOW | 100 | 1.00 | 1305 | 786 | 75 | 272 | 82 | 876 |
| 2D | DREGS WASHER UNDERFLOW | 7.00% | 1.03 | 365.5 | 220.2 | 21.1 | 76.1 | 23.0 | 245.4 |
| 3A | DREGS FILTER LIME MUD PRECOAT | 38.6% | 1.85 | | | | | | |
| 3B | TOTAL TO DREGS FILTER | 13.1% | 1.20 | 365.5 | 220.2 | 21.1 | 76.1 | 23.0 | 245.4 |
| 5A | FIRST DREGS FILTER CAKE 70° C. | 36.5% | 1.79 | 12.4 | 7.5 | 0.72 | 2.59 | 0.78 | 8.35 |
| 4 | DREGS FILTER WASH WATER 70° C. | | 0.98 | 4.0 | 2.4 | 0.23 | 0.82 | 0.25 | 2.66 |
| 5B | WASHED DREGS FILTER CAKE 70° C. | 50.0% | 1.31 | 361.6 | 217.8 | 20.8 | 75.3 | 22.8 | 242.7 |
| 6 | DREGS FILTER FILTRATE 70° C. | | 1.01 | 361.6 | 217.8 | 20.8 | 75.3 | 22.8 | 242.7 |
| 7 | TOTAL DREGS SYSTEM OVERFLOW | | 0.98 | 1666.4 | 1003.9 | 96.0 | 346.9 | 105.0 | 1118.5 |
| 8 | WATER TO SLAKE LIME (95° C.) | | 0.96 | −10035 | 0 | 30882 | CAUSTICIZING | | −40918 |
| 9 | LIME USE, BONE DRY | 100% | 1.59 | 625 | −605 | | −762 | 1386 | OXIDATION |
| | MUD GENERATED, BONE DRY | 100% | 2.65 | | | | | | |
| 10 | GRIT LOSS (WET) | 65.0% | 1.66 | −9411 | −605 | 30882 | −762 | 1386 | −40918 |
| 11 | GRIT WASH WATER | | 0.98 | | | | | | |
| 12 | FLOW THROUGH CAUSTICIZERS 95° C. | 9.0% | 1.21 | 69019 | 46647 | 35402 | 15564 | 6326 | 11727 |
| 13 | WHITE LIQUOR FLOW AT 95° C. | | 1.15 | 60889 | 40255 | 30952 | 12942 | 6743 | 10253 |
| 14 | W L C UNDERFLOW AT 95° C. | 44.0% | 1.53 | 8754 | 5787 | 4450 | 1861 | 969 | 1474 |
| | W L C UNDERFLOW AT 70° C. | 44.0% | 1.55 | 624 | −605 | | −761 | 1386 | |
| 15 | SCRUBBER RECYCLE 70° C. | 3.3% | 1.05 | | | | | | |
| 26 | FILTRATES | | 0.99 | 2205 | 1294 | 924 | 341 | 414 | 527 |
| 7 | DREGS SYSTEM OVERFLOW | | | 1666 | 1004 | 96 | 347 | 105 | 1119 |
| 16 | L M W FEED 70° C. | 10.3% | 1.05 | 12625 | 8086 | 5469 | 2548 | 1488 | 3119 |
| 17 | L M W OVERFLOW (WEAK WASH) 70° C. | 99 | 0.98 | 10547 | 6571 | 4520 | 1967 | 1483 | 2578 |
| 18 | L M W U'FLOW TO MUD STORAGE 70° C. | 46.0% | 1.42 | 2216 | 1381 | 950 | 413 | 312 | 541 |
| | DILUTION WATER-DF PRECOAT | | 0.98 | 138 | −134 | | −168 | 306 | |
| | DILUTION WATER-LMF FEED | | 0.98 | | | | | | |
| 19 | TOTAL DILUTION WATER | | 0.98 | | | | | | |
| 20 | LIME MUD TO DREGS FILTER | 25.0% | 1.18 | 47 | 30 | | | | |
| 21 | FILTER FEED SLURRY | 25.0% | 1.18 | 2216 | 1381 | 950 | 413 | 312 | 541 |
| 22 | CAKE WASH WATER | | 0.98 | 51 | −50 | | −63 | 114 | |
| 23 | FILTER CAKE | 75.0% | 1.86 | 62 | 36 | 26 | 10 | 12 | 15 |
| 24 | LMF FILTRATE 70° C. | 51 | 0.98 | | | | | | |
| 25 | DREGS FILT PRECOAT FILTRATE | | 0.98 | | | | | | |
| 26 | TOTAL FILTRATES | 50 | 0.99 | 2205 | 1294 | 924 | 341 | 414 | 527 |
| 27 | SMELT | | | 67261 | 41287 | 0 | 15121 | 2071 | 50069 |
| 28 | SMELT & WEAK WASH (RAW GREEN LIQUOR) | | | 77809 | 47859 | 4520 | 17088 | 3554 | 52647 |

| | | BREAKDOWN OF TTA-LB/HR | | | | | |
|---|---|---|---|---|---|---|---|
| EXAMPLE | FLOWSHEET SUMMARY | NaOH | Na2S | SO4 | Na2CO3 | TOT S | R.E. |
| 1A | RAW GREEN LIQUOR FLOW 90° C. | 3502 | 13570 | 1551 | 30786 | 15121 | 89.74% |
| 1B | G L CLARIFIER OVERFLOW 90° C. | 3502 | 12965 | 2156 | 30785 | 15120 | 85.74% |
| 1C | G L CLARIFIER UNDERFLOW | 75 | 276 | 46 | 656 | 322 | 85.74% |
| 2A | WATER TO DREGS WASHER | | −605 | 605 | CLC RE LOSS = | | −4.00% |
| 2B | DREGS WASHER FEED | 75 | 276 | 46 | 656 | 322 | 85.74% |
| 2C | DREGS WASHER OVERFLOW | 58 | 216 | 36 | 512 | 252 | 85.74% |
| 2D | DREGS WASHER UNDERFLOW | 16.3 | 60.4 | 10.0 | 143.5 | 70.5 | 85.74% |
| 3A | DREGS FILTER LIME MUD PRECOAT | | | | | | |
| 3B | TOTAL TO DREGS FILTER | 16.3 | 60.4 | 10.0 | 143.5 | 70.5 | 85.74% |
| 5A | FIRST DREGS FILTER CAKE 70° C. | 0.56 | 2.06 | 0.34 | 4.88 | 2.40 | 85.74% |
| 4 | DREGS FILTER WASH WATER 70° C. | 0.18 | 0.65 | 0.11 | 1.56 | 0.76 | 85.74% |
| 5B | WASHED DREGS FILTER CAKE 70° C. | 16.1 | 59.8 | 9.9 | 141.9 | 69.7 | 85.74% |
| 6 | DREGS FILTER FILTRATE 70° C. | 16.1 | 59.8 | 9.9 | 141.9 | 69.7 | 85.74% |
| 7 | TOTAL DREGS SYSTEM OVERFLOW | 74.4 | 275.5 | 45.8 | 654.1 | 321.3 | 85.74% |
| 8 | WATER TO SLAKE LIME (95° C.) | 23928 | | | −23928 | | |
| 9 | LIME USE, BONE DRY | | −605 | 605 | S + C RE LOSS = | | −4.00% |
| | MUD GENERATED, BONE DRY | | | | | | |
| 10 | GRIT LOSS (WET) | 23928 | −605 | 605 | −23928 | 0 | |
| 11 | GRIT WASH WATER | | | | | | |
| 12 | FLOW THROUGH CAUSTICIZERS 95° C. | 27429 | 12360 | 2760 | 6857 | 15120 | 81.74% |
| 13 | WHITE LIQUOR FLOW AT 95° C. | 23981 | 10278 | 2942 | 5995 | 13220 | 77.75% |
| 14 | W L C UNDERFLOW AT 95° C. | 3448 | 1478 | 423 | 862 | 1901 | 77.75% |
| | W L C UNDERFLOW AT 70° C. | | −605 | 605 | WLC RE LOSS = | | −4.00% |
| 15 | SCRUBBER RECYCLE 70° C. | | | | | | |
| 26 | FILTRATES | 716 | 271 | 181 | 308 | 451 | 60.00% |
| 7 | DREGS SYSTEM OVERFLOW | 74 | 275 | 46 | 654 | 321 | 85.74% |
| 16 | L M W FEED 70° C. | 4238 | 2024 | 649 | 1824 | 2673 | 75.71% |
| 17 | L M W OVERFLOW (WEAK WASH) 70° C. | 3502 | 1562 | 647 | 1507 | 2209 | 70.71% |
| 18 | L M W U'FLOW TO MUD STORAGE 70° C. | 736 | 328 | 136 | 317 | 464 | 70.71% |
| | DILUTION WATER-DF PRECOAT | | −134 | 134 | LMW RE LOSS = | | −5.00% |
| | DILUTION WATER-LMF FEED | | | | | | |
| 19 | TOTAL DILUTION WATER | | | | | | |
| 20 | LIME MUD TO DREGS FILTER | | | | | | |
| 21 | FILTER FEED SLURRY | 736 | 328 | 136 | 317 | 464 | 70.71% |
| 22 | CAKE WASH WATER | | −50 | 50 | LMF RE LOSS = | | −10.71% |

TABLE 1-continued

| | | | | | | | |
|---|---|---|---|---|---|---|---|
| 23 | FILTER CAKE | 20 | 8 | 5 | 9 | 13 | 60.00% |
| 24 | LMF FILTRATE 70° C. | | | | | | |
| 25 | DREGS FILT PRECOAT FILTRATE | | | | | | |
| 26 | TOTAL FILTRATES | 716 | 271 | 181 | 308 | 451 | 60.00% |
| 27 | SMELT | 0 | 12008 | 904 | 29279 | 12912 | 93.00% |
| 28 | SMELT & WEAK WASH (RAW GREEN LIQUOR) | 3502 | 13570 | 1551 | 30786 | 15121 | 89.74% |

TABLE 2

| EXAMPLE | FLOWSHEET SUMMARY | 05/18/93 CFD | "WLCGLF2" CFH | GPM | WATER LB/HR | SOLIDS LB/HR | STPD | % Na2O |
|---|---|---|---|---|---|---|---|---|
| 1 | RAW GREEN LIQUOR FLOW 90° C. | 145041 | 6043 | 753 | 363703 | 750 | 9.0 | |
| 2A | G L CLARIFIER UNDERFLOW | 3254 | 136 | 17 | 7715 | 706 | 7.5 | 44.2% |
| 2B | G L FILTER CAKE | 258 | 11 | 1.3 | 194 | 706 | 8.5 | 3.5% |
| 2C | G L FILTER FILTRATE 90° C. | 2996 | 125 | 15.6 | 7522 | 0.23 | 0.00 | |
| 3A | DILUTION WATER | 1496 | 62 | 8 | 3805 | | | |
| 3B | GLF UNDERFLOW SLURRY-, % ss | 1773 | 74 | 9 | 3998 | 706 | 8.5 | 3.5% |
| 3C | DREGS FILTER LIME MUD PRECOAT | 569 | 23.7 | 3.0 | 1056 | 1058 | 12.7 | |
| 4 | DREGS FILTER WASH WATER 70° C. | 1141 | 47.6 | 5.9 | 2903 | | | |
| 5 | DREGS FILTER CAKE 70° C. | 1038 | 43.2 | 5.4 | 1759 | 1764 | 21.2 | 0.16% |
| 6 | DREGS FILTER FILTRATE 70° C. | 2437 | 102 | 12.7 | 6198 | | | |
| 7A | G L CLARIFIER OVERFLOW 90° C. | 141787 | 5908 | 737 | 355987.3 | 43.9 | 0.5 | |
| 7B | CLARIFIED GREEN LIQUOR FLOW 90° C. | 144783 | 6033 | 751 | 363509 | 44.2 | 0.5 | |
| 8 | WATER TO SLAKE LIME (95° C.) | 2788 | 116.2 | 14.5 | 6977 | | | |
| 9 | LIME USE, BONE DRY | 6179 | 257 | 32.1 | | 25549 | 306.6 | |
| | MUD GENERATED, BONE DRY | 6179 | 257 | 32.1 | | 42593 | 511.1 | |
| 10 | GRIT LOSS (WET) | 182 | 7.6 | 0.9 | 275 | 511 | 6.1 | |
| 11 | GRIT WASH WATER | 108 | 4.5 | 0.6 | 275 | | | |
| 12 | FLOW THROUGH CAUSTICIZERS 95° C. | 148608 | 6192 | 772 | 356533 | 42126 | 505.5 | |
| 13 | WHITE LIQUOR FLOW AT 95° C. | 124579 | 5191 | 647 | 311702 | 37.3 | 0.45 | |
| 14 | W L C UNDERFLOW AT 95° C. | 24024 | 1001 | 125 | 44831 | 42088 | 505.1 | 12.2% |
| | W L C UNDERFLOW AT 70° C. | 23732 | 989 | 123 | 44831 | 42088 | 505.1 | |
| 15 | SCRUBBER RECYCLE 70° C. | 79566 | 3315 | 413 | 199698 | 7234 | 86.8 | |
| 26 | LMF FILTRATES | 66424 | 2768 | 345 | 168938 | 8.5 | 0.1 | |
| 6 | DREGS FILTER FILTRATE 70° C. | 2437 | 102 | 13 | 6198 | | | |
| 16 | L M W FEED 70° C. | 172159 | 7173 | 894 | 419663 | 49331 | 592.0 | 12.5% |
| 17 | L M W OVERFLOW (WEAK WASH) 70° C. | 143005 | 5959 | 743 | 363703 | 37.3 | 0.45 | |
| 18 | L M W U'FLOW TO MUD STORAGE 70° C. | 29154 | 1215 | 151 | 55961 | 49294 | 591.5 | 2.59% |
| | DILUTION WATER-DF PRECOAT | 760 | 32 | 3.9 | 1932 | | | |
| | DILUTION WATER-LMF FEED | 34616 | 1442 | 180 | 88041 | | | |
| 19 | TOTAL DILUTION WATER | 35375 | 1474 | 184 | 89973 | | | |
| 20 | LIME MUD TO DREGS FILTER | 1386 | 58 | 7.2 | 3133 | 1058 | 12.7 | |
| 21 | FILTER FEED SLURRY | 63144 | 2631 | 328 | 142800 | 48235 | 578.8 | 2.65% |
| 22 | CAKE WASH WATER | 15766 | 657 | 82 | 40100 | | | |
| 23 | FILTER CAKE | 13303 | 554 | 69 | 16040 | 48227 | 578.7 | 0.075% |
| 24 | LMF FILTRATE 70° C. | 65607 | 2734 | 341 | 166860 | 8.5 | 0.10 | |
| 25 | DREGS FILT PRECOAT FILTRATE | 817 | 34 | 4.2 | 2078 | | | |
| 26 | TOTAL FILTRATES | 66424 | 2768 | 345 | 168938 | 8.5 | 0.10 | |
| 27 | SMELT | | | | | 713 | 8.6 | |
| 28 | SMELT & WEAK WASH (RAW GREEN LIQUOR) | | | | | | | |

| EXAMPLE | FLOWSHEET SUMMARY | SLURRY SS | SLURRY SP GR | LB/HR CHEM | TTA | BREAKDOWN OF CHEM-LB/HR NaOH | Na2S | SO4 | Na2CO3 |
|---|---|---|---|---|---|---|---|---|---|
| 1 | RAW GREEN LIQUOR FLOW 90° C. | 1696 | 1.17 | 77721 | 47874 | 4428 | 17086 | 3410 | 52798 |
| 2A | G L CLARIFIER UNDERFLOW | 7.00% | 1.19 | 1662 | 1003 | 94 | 347 | 102 | 1121 |
| 2B | G L FILTER CAKE | 75.00% | 1.40 | 42 | 25 | 2 | 9 | 3 | 28 |
| 2C | G L FILTER FILTRATE 90° C. | 26 | 1.17 | 1620 | 978 | 92 | 338 | 99 | 1092 |
| 3A | DILUTION WATER | | 0.98 | 612 | −602 | | −766 | 1378 | |
| 3B | GLF UNDERFLOW SLURRY-, % ss | 14.9% | 1.03 | 41.7 | 25.2 | 2.4 | 8.7 | 2.5 | 28.1 |
| 3C | DREGS FILTER LIME MUD PRECOAT | 38.8% | 1.84 | | | | | | |
| 4 | DREGS FILTER WASH WATER 70° C. | | 0.98 | | | | | | |
| 5 | DREGS FILTER CAKE 70° C. | 50.0% | 1.31 | 4.6 | 2.8 | 0.3 | 1.0 | 0.3 | 3.1 |
| 6 | DREGS FILTER FILTRATE 70° C. | | 0.98 | 37.1 | 22.4 | 2.1 | 7.7 | 2.3 | 25.0 |
| 7A | G L CLARIFIER OVERFLOW 90° C. | | 1.17 | 76683 | 46270 | 4336 | 15981 | 4688 | 51677 |
| 7B | CLARIFIED GREEN LIQUOR FLOW 90° C. | 100 | 1.17 | 78304 | 47248 | 4427 | 16319 | 4787 | 52769 |
| 8 | WATER TO SLAKE LIME (95° C.) | | 0.96 | −10066 | 0 | 30976 | CAUSTICIZING | | −41042 |
| 9 | LIME USE, BONE DRY | 100% | 1.59 | 622 | −602 | | −758 | 1380 | OXIDATION |
| | MUD GENERATED, BONE DRY | 100% | 2.65 | | | | | | |
| 10 | GRIT LOSS (WET) | 65.0% | 1.66 | −9444 | −602 | 30976 | −758 | 1380 | −41042 |
| 11 | GRIT WASH WATER | | 0.98 | | | | | | |
| 12 | FLOW THROUGH CAUSTICIZERS 95° C. | 9.0% | 1.21 | 68859 | 46646 | 35404 | 15561 | 6167 | 11727 |

TABLE 2-continued

| | | | | | | | | | |
|---|---|---|---|---|---|---|---|---|---|
| 13 | WHITE LIQUOR FLOW AT 95° C. | | 1.15 | 60744 | 40255 | 30952 | 12942 | 6598 | 10253 |
| 14 | W L C UNDERFLOW AT 95° C. | 44.0% | 1.53 | 8737 | 5790 | 4452 | 1861 | 949 | 1475 |
| | W L C UNDERFLOW AT 70° C. | 44.0% | 1.55 | 622 | −602 | | −758 | 1380 | |
| 15 | SCRUBBER RECYCLE 70° C. | 3.4% | 1.04 | | | | | | |
| 26 | LMF FILTRATES | | 0.99 | 1894 | 1134 | 924 | 298 | 361 | 311 |
| 6 | DREGS FILTER FILTRATE 70° C. | | 0.98 | 37 | 22 | 2 | 8 | 2 | 25 |
| 16 | L M W FEED 70° C. | 10.5% | 1.05 | 10668 | 6946 | 5378 | 2167 | 1312 | 1811 |
| 17 | L M W OVERFLOW (WEAK WASH) 70° C. | 100 | 0.98 | 8881 | 5625 | 4428 | 1665 | 1297 | 1491 |
| 18 | L M W U'FLOW TO MUD STORAGE 70° C. | 46.0% | 1.41 | 1906 | 1207 | 950 | 357 | 278 | 320 |
| | DILUTION WATER-DF PRECOAT | | 0.98 | 118 | −115 | | −144 | 263 | |
| | DILUTION WATER-LMF FEED | | 0.98 | | | | | | |
| 19 | TOTAL DILUTION WATER | | 0.98 | | | | | | |
| 20 | LIME MUD TO DREGS FILTER | 25.0% | 1.17 | 41 | 26 | | | | |
| 21 | FILTER FEED SLURRY | 25.0% | 1.17 | 1906 | 1207 | 950 | 357 | 278 | 320 |
| 22 | CAKE WASH WATER | | 0.98 | 42 | −41 | | −51 | 93 | |
| 23 | FILTER CAKE | 75.0% | 1.86 | 53 | 32 | 26 | 8 | 10 | 9 |
| 24 | LMF FILTRATE 70° C. | 51 | 0.98 | | | | | | |
| 25 | DREGS FILT PRECOAT FILTRATE | | 0.98 | | | | | | |
| 26 | TOTAL FILTRATES | 50 | 0.99 | 1894 | 1134 | 924 | 298 | 361 | 311 |
| 27 | SMELT | | | 68841 | 42250 | 0 | 15421 | 2113 | 51307 |
| 28 | SMELT & WEAK WASH (RAW GREEN LIQUOR) | | | 77721 | 47874 | 4428 | 17086 | 3410 | 52798 |

| EXAMPLE | FLOWSHEET SUMMARY | BREAKDOWN OF TTA-LB/HR | | | | | |
|---|---|---|---|---|---|---|---|
| | | NaOH | Na2S | SO4 | Na2CO3 | TOT S | R.E. |
| 1 | RAW GREEN LIQUOR FLOW 90° C. | 3431 | 13569 | 1488 | 30874 | 15057 | 90.12% |
| 2A | G L CLARIFIER UNDERFLOW | 73 | 275 | 44 | 655 | 320 | 86.12% |
| 2B | G L FILTER CAKE | | | | | | 86.12% |
| 2C | G L FILTER FILTRATE 90° C. | 1.8 | 6.9 | 1.1 | 16.4 | 8.0 | 86.12% |
| 3A | DILUTION WATER | 71 | 268 | 43 | 639 | 312 | 86.12% |
| 3B | GLF UNDERFLOW SLURRY-, % ss | | −602 | 602 | CLC RE LOSS = | | −4.00% |
| 3C | DREGS FILTER LIME MUD PRECOAT | 1.8 | 6.9 | 1.1 | 16.4 | 8.0 | 86.12% |
| 4 | DREGS FILTER WASH WATER 70° C. | | | | | | |
| 5 | DREGS FILTER CAKE 70° C. | 0.2 | 0.8 | 0.1 | 1.8 | 0.9 | 86.12% |
| 6 | DREGS FILTER FILTRATE 70° C. | 1.6 | 6.1 | 1.0 | 14.6 | 7.1 | 86.12% |
| 7A | G L CLARIFIER OVERFLOW 90° C. | 3359 | 12692 | 2046 | 30219 | 14737 | 86.12% |
| 7B | CLARIFIED GREEN LIQUOR FLOW 90° C. | 3430 | 12960 | 2089 | 30858 | 15049 | 86.12% |
| 8 | WATER TO SLAKE LIME (95° C.) | 24000 | | | −24000 | | |
| 9 | LIME USE, BONE DRY | | −602 | 602 | S + C RE LOSS = | | −4.00% |
| 10 | MUD GENERATED, BONE DRY | 24000 | −602 | 602 | −24000 | 0 | |
| 11 | GRIT LOSS (WET) | | | | | | |
| 12 | GRIT WASH WATER | | | | | | |
| | FLOW THROUGH CAUSTICIZERS 95° C. | 27431 | 12358 | 2691 | 6858 | 15049 | 82.12% |
| 13 | WHITE LIQUOR FLOW AT 95° C. | 23981 | 10278 | 2879 | 5995 | 13157 | 78.12% |
| 14 | W L C UNDERFLOW AT 95° C. | 3449 | 1478 | 414 | 862 | 1892 | 78.12% |
| | W L C UNDERFLOW AT 70° C. | | −602 | 602 | WLC RE LOSS = | | −4.00% |
| 15 | SCRUBBER RECYCLE 70° C. | | | | | | |
| 26 | LMF FILTRATES | 716 | 236 | 158 | 182 | 394 | 60.00% |
| 6 | DREGS FILTER FILTRATE 70° C. | 2 | 6 | 1 | 15 | 7 | 86.12% |
| 16 | L M W FEED 70° C. | 4167 | 1721 | 573 | 1059 | 2294 | 75.03% |
| 17 | L M W OVERFLOW (WEAK WASH) 70° C. | 3431 | 1322 | 566 | 872 | 1888 | 70.03% |
| 18 | L M W U'FLOW TO MUD STORAGE 70° C. | 736 | 284 | 121 | 187 | 405 | 70.03% |
| | DILUTION WATER-DF PRECOAT | | −115 | 115 | LMW RE LOSS = | | −5.00% |
| | DILUTION WATER-LMF FEED | | | | | | |
| 19 | TOTAL DILUTION WATER | | | | | | |
| 20 | LIME MUD TO DREGS FILTER | | | | | | |
| 21 | FILTER FEED SLURRY | 736 | 284 | 121 | 187 | 405 | 70.03% |
| 22 | CAKE WASH WATER | | −41 | 41 | LMF RE LOSS = | | −10.03% |
| 23 | FILTER CAKE | 20 | 7 | 4 | 5 | 11 | 60.00% |
| 24 | LMF FILTRATE 70° C. | | | | | | |
| 25 | DREGS FILT PRECOAT FILTRATE | | | | | | |
| 26 | TOTAL FILTRATES | 716 | 236 | 158 | 182 | 394 | 60.00% |
| 27 | SMELT | 0 | 12247 | 922 | 30003 | 13169 | 93.00% |
| 28 | SMELT & WEAK WASH (RAW GREEN LIQUOR) | 3431 | 13569 | 1488 | 30874 | 15057 | 90.12% |

Additionally, Charts 1 and 2 demonstrate the superior characteristics of dregs obtained with the present invention relative to dregs produced by the conventional processes. In Chart 1, the Untreated column designates the pH of the untreated underflow of the green liquor clarifier, the Precoat Only column designates the pH of dregs resulting from precoat dregs filter treatment only, the CAUSTEC Only column designates the pH of dregs resulting from CAUSTEC™ treatment only, and the CAUSTEC+Precoat column designates the pH of dregs resulting from CAUSTEC™ and precoat dregs filter treatment dregs. As shown, it is only with the process of the present invention that an acceptable pH level is reached. In Chart 2, comparative data is presented regarding % $Na_2O$ (a measure of the amount of alkali) in the dregs resulting from the processes described above. As above, the Untreated column designates the amount of alkali in the untreated underflow of the green liquor clarifier, the Precoat Only column designates the amount of alkali in dregs resulting from precoat dregs filter treatment only, the CAUSETEC Only column designates the amount of alkali in dregs resulting from CAUSTEC™ treatment only, and the CAUSTEC+Precoat column designates the amount of alkali in dregs resulting from CAUSTEC™ and precoat dregs filter treatment dregs. Again, the dregs produced by the present invention utilizing a CAUSTEC cassette dregs filter in combination with a dregs precoat filter contains much less alkali then the other processes.

Modifications and variations of the present invention are possible in light of the above teachings. It is therefore to be understood that within the scope of the appended claims, the invention may be practiced otherwise than is specifically described herein.

What is claimed is:

1. In a kraft pulp mill, a process for removing and washing dregs from green liquor comprising the steps of:

clarifying the green liquor in a green liquor clarifier to separate the green liquor into an overflow comprising clarified green liquor and an underflow comprising dregs and green liquor;

filtering the underflow to form a first dregs cake that is at least 50% solid;

diluting the dregs cake to less than 20% solid; and filtering the diluted dregs cake to form a second dregs cake that is at least 50% solid and has a pH less than 12.5;

wherein the underflow is filtered in a filter that does not use a precoat.

2. The process of claim 1, wherein the diluted dregs cake is filtered in a precoat filter.

3. The process of claim 1, wherein the green liquor clarifier underflow contains less than 10% solids.

4. The process of claim 1, wherein the step of diluting is performed by flushing with water.

5. In a kraft pulp mill, a process for removing and washing dregs from green liquor comprising, the steps of:

clarifying the green liquor in a green liquor clarifier to separate the green liquor into an overflow containing clarified green liquor and an underflow containing green liquor and dregs;

filtering the underflow to remove green liquor and form a dregs cake that is at least 50% solid;

flushing the dregs cake with water to dilute the dregs cake; and dewatering the dregs cake to at least 50% solids and a pH below 12.5;

wherein the green liquor clarifier underflow is filtered by a cassette-type pressure filter.

6. The process of claim 5, wherein the dregs cake formed by filtering the underflow is diluted to less than 20% solid.

7. The process of claim 5, wherein the diluted dregs cake is dewatered in a precoat filter.

* * * * *